(12) United States Patent
Miyahawa et al.

(10) Patent No.: US 7,455,415 B2
(45) Date of Patent: Nov. 25, 2008

(54) OPERATION DEVICE

(75) Inventors: Akihito Miyahawa, Aichi (JP); Kouichi Itoigawa, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 11/853,888

(22) Filed: Sep. 12, 2007

(65) Prior Publication Data
US 2008/0068202 A1    Mar. 20, 2008

(30) Foreign Application Priority Data
Sep. 14, 2006    (JP) .............................. 2006-249392

(51) Int. Cl.
*G01D 11/28* (2006.01)
(52) U.S. Cl. .................... 362/30; 362/489; 362/511; 362/612; 362/623; 362/631; 362/800
(58) Field of Classification Search .................. 362/29, 362/30, 90, 631, 612, 489, 511, 623, 626, 362/602, 604, 605; 200/51 R, 52; 439/535, 439/536; 174/54, 58
See application file for complete search history.

(56) References Cited

U.S. PATENT DOCUMENTS 4,343,975 A * 8/1982 Sado .......................... 200/314
7,059,735 B2 * 6/2006 Orikasa ........................ 362/23
7,086,768 B2 * 8/2006 Suwa et al. .................. 362/555
2003/0093895 A1 * 5/2003 Miyazaki et al. .............. 29/622

FOREIGN PATENT DOCUMENTS

| JP | 5-31057 U | 4/1993 |
| JP | 8-194219 A | 7/1996 |
| JP | 2005-293953 A | 10/2005 |

\* cited by examiner

*Primary Examiner*—Jong-Suk (James) Lee
*Assistant Examiner*—Leah S Lovell
(74) *Attorney, Agent, or Firm*—Mark Simpson; Saul Ewing LLP

(57) ABSTRACT

A compact operation device that illuminates illumination windows with a simple structure and has a high level of design freedom. The operation device has an ornamental panel including operation portions and illumination windows. An elastomeric sheet below the ornamental panel is resiliently deformed by the operation portions. Contacts are arranged on the elastomeric sheet. A circuit board is arranged adjacent to the elastomeric sheet. Switches are arranged on the circuit board in correspondence with the contacts. The switches contact the contacts when the elastomeric sheet is deformed. A light guide arranged on the circuit board guides light from a light source arranged on the circuit board to the illumination portions. Openings extend through the circuit board in correspondence with the illumination portions. The light guide includes a reflection structure for reflecting light from the light source toward the openings.

6 Claims, 3 Drawing Sheets

OPERATION DEVICE

CROSS-REFERENCE TO RELATED APPLICATIONS

This application is based upon and claims the benefit of priority from the prior Japanese Patent Application No. 2006-249392, filed on Sep. 14, 2006, the entire contents of which are incorporated herein by reference.

BACKGROUND OF THE INVENTION

The present invention relates to an operation device having a function for illuminating an operation portion.

A typical operation device arranged in, for example, a passenger compartment of a vehicle illuminates an operation portion during the nighttime. This enables the position of the operation portion to be identified.

Referring to FIG. 1, an operation device 51 of the prior art includes an ornamental panel 53 and a switch assembly 54, which is arranged at the rear side of the ornamental panel 53. The ornamental panel 53 includes a plurality of operation portions 52. A plurality of illumination windows 57 are respectively arranged adjacent to the plurality of operation portions 52. The switch assembly 54 includes a circuit board 55 and an elastomeric sheet 56 covering the circuit board 55. The circuit board 55 includes switches respectively located at positions corresponding to the operation portions 52. The elastomeric sheet 56 is transparent and planar. The circuit board 55 also includes a plurality of light sources 58, such as top-view type LEDs, respectively located at positions corresponding to the illumination windows 57.

Each light source 58 emits light through and out of the corresponding illumination window 57. The light illuminates the operation portion 52. This enables recognition of the operation portion 52 during the nighttime.

However, the operation device 51 of the prior art requires each operation portion 52 to be provided with the light source 58. This increases the components mounted on the circuit board 55, enlarges the circuit board 55, and imposes restrictions on the component layout of the circuit board 55. Further, the light sources 58 may have different qualities. In such a case, the brightness and color of the light may differ between operation portions 52.

Japanese Laid-Open Patent Publication No. 8-194219 describes an illumination device that uses a light guide.

FIG. 2 schematically shows the illumination device of the above publication. As shown in FIG. 2, the illumination device 61 includes a light guide 62, which is planar and made of an acrylic resin. A light source 63, such as a side view type LED, is arranged beside the light guide 62. The light guide 62 includes a plurality of projections 64 formed on the opposite side of a light emitting surface 62a. The light source 63 emits light that enters one end face of the light guide 62. The projections 64 diffuse the light from the light source 63 to illuminate the light emitting surface 62a. In this manner, the illumination device 61 can illuminate a plurality of illumination windows, which are arranged at locations corresponding to the light emitting surface 62a, with a single light source 63.

Application of the illumination device 61 of FIG. 2 to the operation device 51 of FIG. 1 would reduce the components that are mounted in the circuit board 55 and increase the freedom for the component layout of the circuit board 55. In this case, for example as shown in FIG. 3, the light guide 62 is arranged between the operation portions 52 and the elastomeric sheet 56. The light source 63, which is a side-view type LED, is arranged beside the light guide 62. The light of the light source 63 entering the end face of the light guide 62 is diffused and reflected in the light guide 62, and the projections 64 reflect the light toward the illumination windows 57. The light is emitted out of the illumination windows 57. This illuminates the illumination windows 57. Thus, the operation device 51 of FIG. 3 illuminates a plurality of the illumination windows 57 with a single light source. This reduces the components mounted on the circuit board 55 and increases the component layout freedom.

However, the operation device 51 of FIG. 3 includes a switch contact 52a for each operation portion 52. Further, the elastomeric sheet 56 also includes switch contacts 56a that correspond to the switch contacts 52a of the operation portions 52. To prevent the light guide 62 from interfering with the switch contacts 52a and 56a, openings 62b must be formed in the light guide 62. However, the openings 62b located between the light source 63 and the illumination windows 57 would result in the amount of light guided to the illumination windows 57 being insufficient. As a result, the brightness of the illumination windows 57 may be insufficient. Further, the brightness may differ between illumination windows 57.

Additionally, the light guide 62 may be displaced with respect to the light source 63. This would result in an insufficient amount of light entering the light guide 62 from the light source 63.

Further, space for a circuit board 65, which is used to operate the light source 63, must be provided beside the light guide 62. This enlarges the operation device 51 in the planar direction (lateral direction in FIG. 3).

In this manner, the operation device 51 of FIG. 3, which applies the teaching of the above publication still has various problems and requires improvements.

SUMMARY OF THE INVENTION

The present invention provides a compact operation device that illuminates a plurality of illumination windows with a simple structure and has a high level of design freedom.

One aspect of the present invention is an operation device including an ornamental panel having a front side and a rear side. The ornamental panel includes a plurality of operation portions arranged on the front side and a plurality of illumination portions arranged in or near the plurality of the operation portions. The illumination portions are light-transmissive. A resiliently deformable member is arranged at the rear side of the ornamental panel and resiliently deformed by force applied by the plurality of operation portions. A plurality of contacts are arranged on the resiliently deformable member. A circuit board is arranged adjacent to the resiliently deformable member and includes a first surface facing toward the resiliently deformable member and a second surface located on the opposite side of the first surface. A plurality of switches are arranged on the first surface of the circuit board in correspondence with the plurality of contacts. Each of the plurality of switches is contactable with a corresponding one of the contacts when the resiliently deformable member is resiliently deformed. At least one light source is arranged on the second surface of the circuit board. Quantity of the at least one light source is less than quantity of the plurality of illumination portions. A light guide, arranged on the second surface of the circuit board, guides light from the at least one light source to each of the plurality of illumination portions. The circuit board includes a plurality of openings extending through the circuit board at locations corresponding to the plurality of illumination portions. The light guide includes a reflection structure for reflecting light from the at least one light source toward the plurality of openings.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
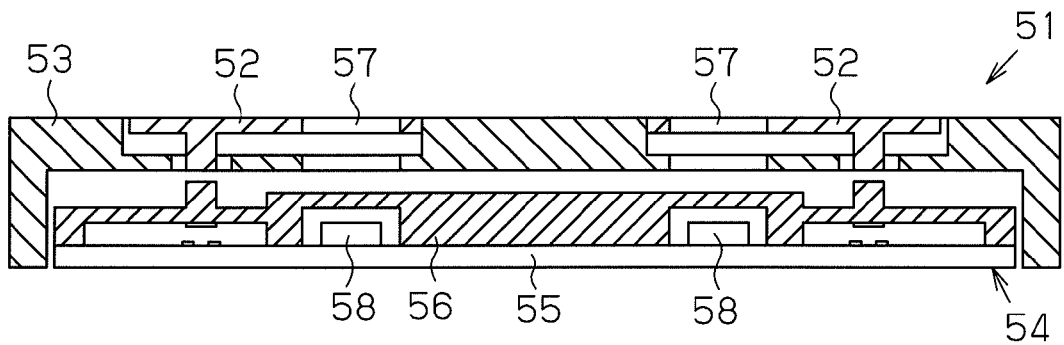
FIG. 1 is a cross-sectional view of a prior art operation device.
Figure 2:
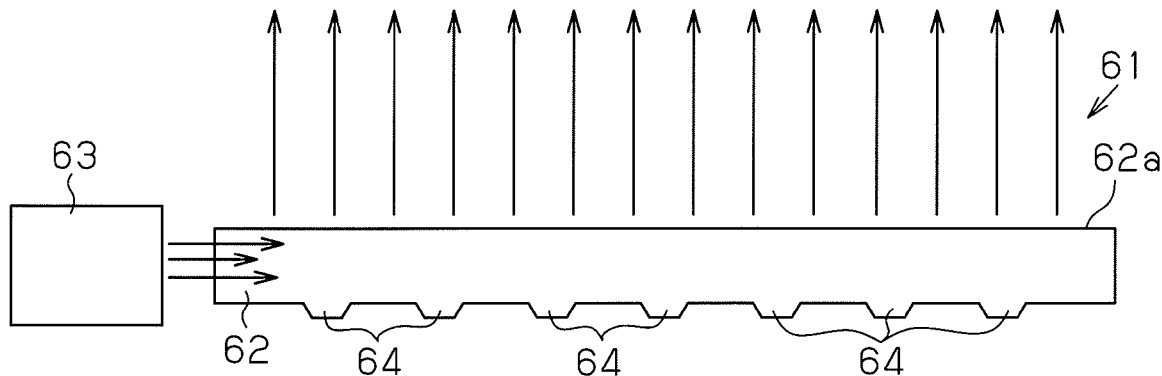
FIG. 2 is a schematic diagram showing the light guide principle of a prior art illumination device.

In the drawings, like numerals are used for like elements throughout.

An operation device 1 according to a preferred embodiment of the present invention will now be discussed with reference to FIGS. 4 to 6.

Figure 4:
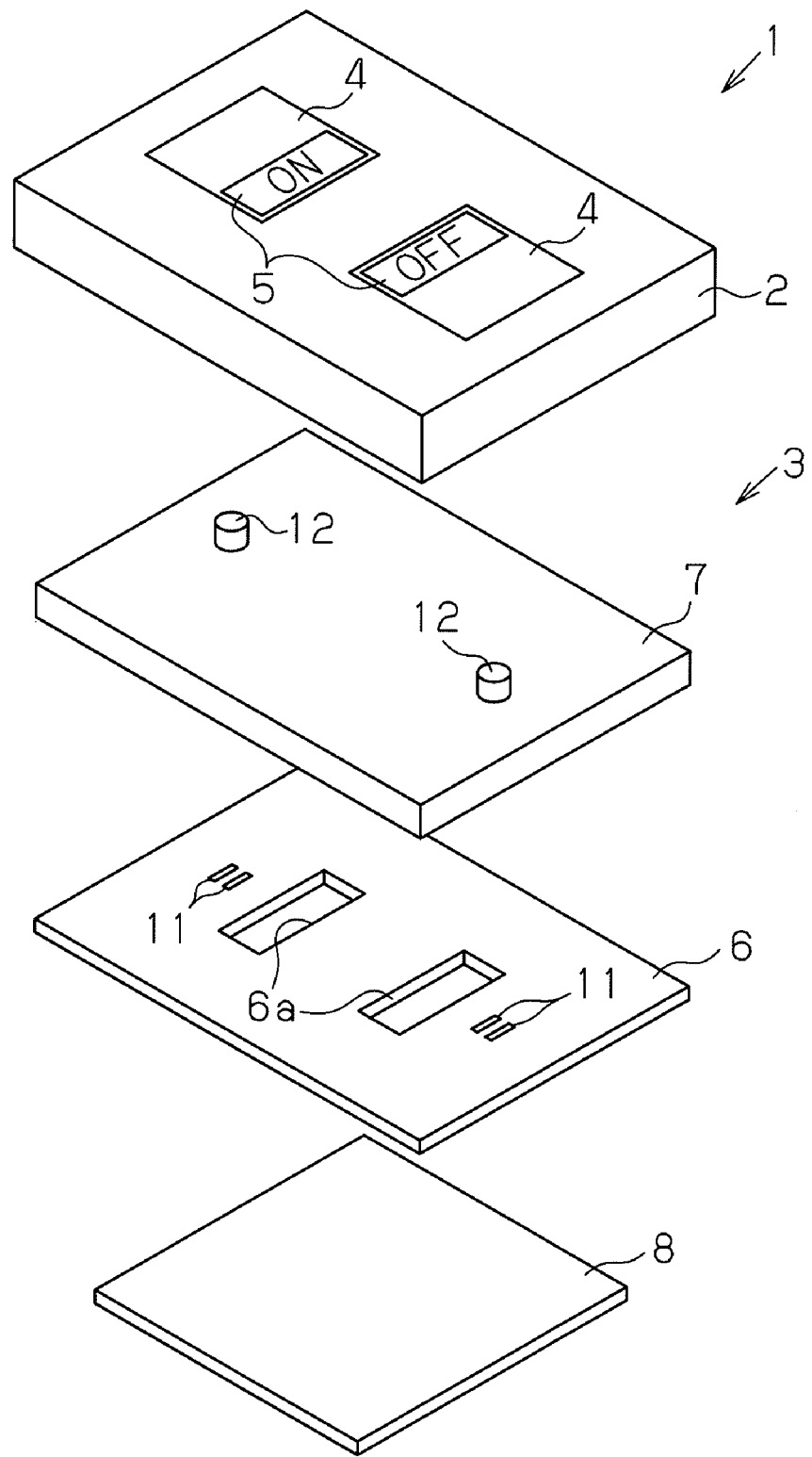

Referring to FIG. 4, the operation device 1 includes a housing 2, which serves as an ornamental panel, and a switch assembly 3, which is arranged at the rear side (lower side as viewed in FIG. 4) of the housing 2. The operation device 1 is arranged, for example, near the driver's seat in a vehicle on a steering wheel or a dashboard. The switch assembly 3 is covered by the housing 2.

Figure 5:
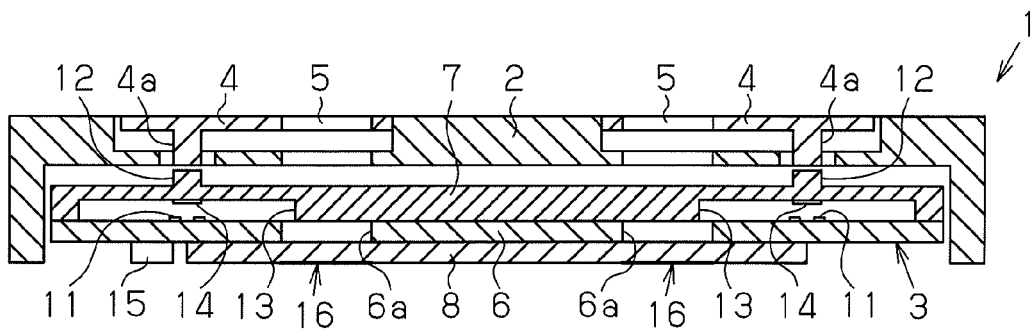
FIG. 5 is a cross-sectional view of the operation device shown in FIG. 4.

As shown in FIGS. 4 and 5, the housing 2 has an ornamental surface (upper surface as viewed in FIG. 5) including a plurality of (for example, two) operation portions 4. Each operation portion 4 is supported in a manner tiltable into the housing 2. An activation projection 4a extends downward from each operation portion 4. Each operation portion 4 includes a transparent illumination window 5 (illumination portion). In the preferred embodiment, the letters "ON" are printed on one of the operation portions 4, and the letters "OFF" are printed on the other operation portion 4. Light emitted out of the two illumination windows 5 brightens the letters of the two illumination windows 5 and entirely illuminates the two operation portions 4.

Referring to FIGS. 4 and 5, the switch assembly 3 includes a circuit board 6, an elastomeric sheet 7 (resiliently deformable member), and a planar light guide 8. The elastomeric sheet 7 is arranged on the circuit board 6. The light guide 8 is arranged under the circuit board 6.

The circuit board 6 has an upper surface including two fixed contact pairs 11 respectively corresponding to the two operation portions 4. Each of the fixed contact pairs 11 functions as a switch. A plurality of openings 6a shaped identically (rectangular) to the illumination windows 5 extend through the circuit board 6 at locations corresponding to the illumination windows 5.

The elastomeric sheet 7, which is a transparent planar member, is formed from a resilient soft resin such as silicone rubber. The elastomeric sheet 7 covers the entire upper surface of the circuit board 6. The elastomeric sheet 7 has substantially the same shape and size as the circuit board 6. A plurality of projections 12 project from the upper surface of the elastomeric sheet 7 toward the housing 2 at locations corresponding to the activation projections 4a of the operation portions 4.

As shown in FIG. 5, a plurality of recesses 13 are arranged in the lower surface of the elastomeric sheet 7 facing toward the circuit board 6 at locations corresponding to the operation portions 4. A movable contact 14 is arranged in each recess 13 at a location corresponding to the associated projection 12. When one of the operation portions 4 on the housing 2 is pushed, force is applied from above to the corresponding projection 12 via the associated activation projection 4a. The force resiliently deforms the elastomeric sheet 7. As a result, the corresponding movable contact 14 comes into contact with the associated fixed contact pair 11 on the circuit board 6. When the projection 12 is released from the force, the elastomeric sheet 7 returns to its original shape, and the movable contact 14 is separated from the fixed contact pair 11. Accordingly, the pushing of the operation portion 4 enables the connection state of the fixed contact pair 11 to be switched.

Figure 6:
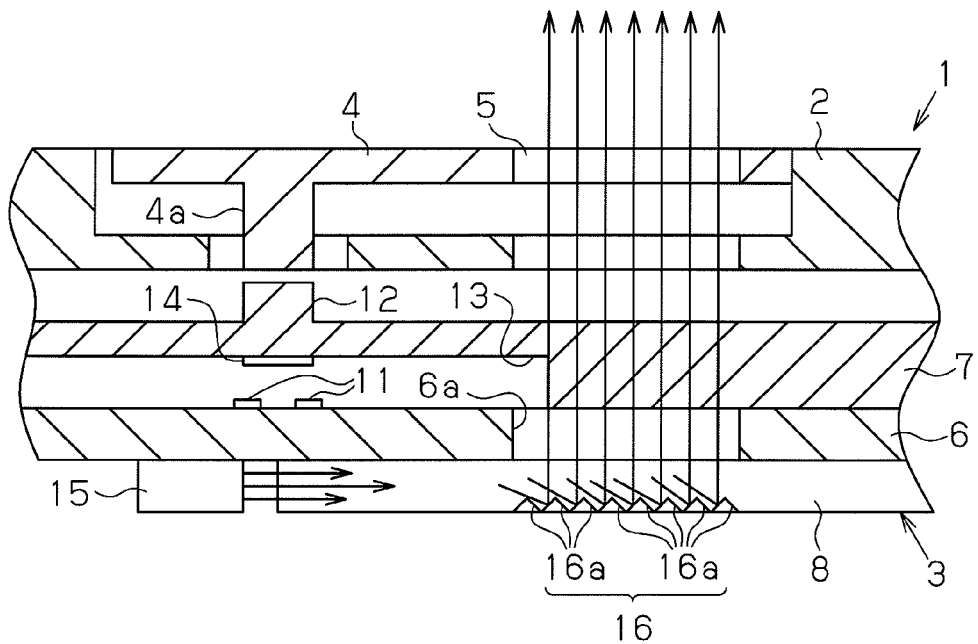
FIG. 6 is a enlarged cross-sectional view partially showing the operation device of FIG. 5.

As shown in FIGS. 5 and 6, a side-view type LED 15 is connected to the lower surface of the circuit board 6, that is, the surface of the circuit board 6 opposite the side on which the fixed contact pairs 11 are arranged. The LED 15 functions as a light source that emits light in a direction parallel to the lower surface of the circuit board 6.

The light guide 8 is arranged in contact with the lower surface of the circuit board 6. The light guide 8 is a plate formed from a light guiding material, such as a transparent acrylic resin, a transparent styrene resin, and a transparent urethane resin. The light guide 8 is arranged parallel to the elastomeric sheet 7. The light guide 8 is smaller than the circuit board 6 and extends sideward from the LED 15 toward locations corresponding to the illumination windows 5. More specifically, the light guide 8 has an end face located near the light emitting surface of the LED 15 so that light enters the end face of the light guide 8 from the LED 15. A plurality of reflectors 16 (indicated by thick lines in FIG. 5) are arranged in the light guide 8 at locations corresponding to the illumination windows 5. The reflectors 16 reflect the light guided into the light guide 8 toward the illumination window 5. In the preferred embodiment, the reflectors 16 serve as a reflection structure of the present invention. Referring to FIG. 6, each reflector 16 is formed by a plurality of fine conical recesses 16a, each having a diameter and depth of, for example, several micrometers to several tens of micrometers. Further, the fine conical recesses 16a each provide a facet surface for reflecting light toward the corresponding illumination window 5. The reflectors 16, which have a fine structure, may be shaped, sized, and concentrated so as to appropriately suppress differences in the brightness and color of the reflection light. The reflectors 16 may be formed on the upper surface of the light guide 8. Further, the recesses 16a do not have to be conical and may be formed to be, for example, pyramidal or cylindrical.

Figure 3:
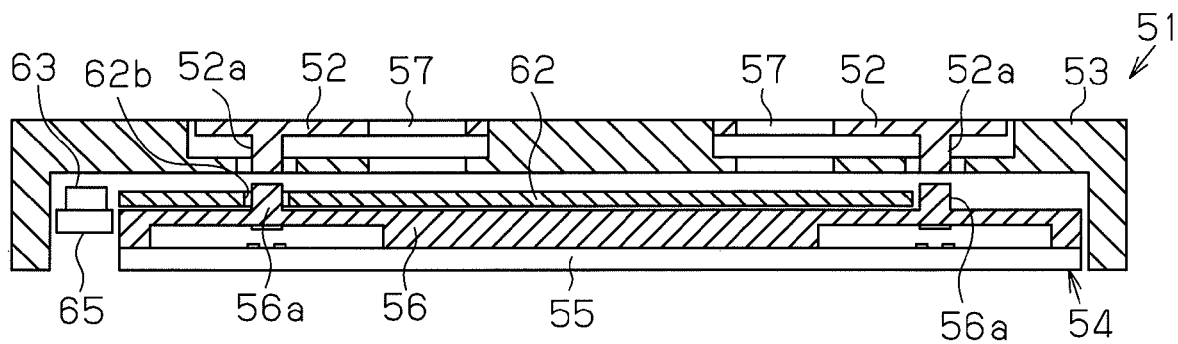
FIG. 3 is a cross-sectional view of a prior art operation device formed by combining the operation device of FIG. 4 is an exploded perspective view showing an operation device according to a preferred embodiment of the present invention.

In the operation device 1, as indicated by the arrows shown in FIG. 3, the light emitted from the LED 15 enters one side of the light guide 8. The light is reflected and diffused in the light guide 8 and guided to the reflectors 16. Reflection surfaces of the recesses 16a in each reflector 16 reflect the light toward the corresponding illumination windows 5. As a result, the light emitted from the light guide 8 is transmitted through the openings 6a and the elastomeric sheet 7 to the corresponding illumination windows 5. The light is then emitted out of the illumination windows 5.

The operation device 1 of the preferred embodiment has the advantages described below.

(1) The LED 15 and the light guide 8 are arranged on the surface (lower surface) of the circuit board 6 opposite the side on which the fixed contact pairs 11 are arranged. This prevents the light guide 8 from interfering with the fixed contact pairs 11 and the switch activation portions (activation projections 4a and projections 12). Further, the openings 6a are arranged at locations corresponding to the illumination windows 5 of the circuit board 6. Thus, the light from the LED that is guided by the light guide 8 is emitted out of the illumination windows 5 through the openings 6a. This eliminates the need for processing the light guide 8 so as to prevent interference with the fixed contact pairs 11 and the switch activation portions. Accordingly, the light of the LED 15 is sufficiently guided to the reflectors 16, that is, locations corresponding to the illumination windows 5. Further, the LED 15 and the light guide 8 are both arranged on the circuit board 6. This prevents displacement between the LED 15 and the light guide 8. The connection of the LED 15 to the circuit board 6 also eliminates the need for a separate circuit board used exclusively for the LED 15. Additionally, space in the lateral direction of the operation device 1 is not necessary for the arrangement of the LED 15. This avoids enlargement of the operation device. Accordingly, the operation device 1 is compact, illuminates the plurality of illumination windows 5 with a simple structure, and has a high level of design freedom.

(2) The reflectors 16 include the plurality of fine recesses 16a and are defined by regions that undergo a surface roughening process. Accordingly, the recesses 16a ensure that the light from the LED 15 is diffused and reflected by the recesses 16a. Further, there is no need for separate components to guide light into light guide 8. This reduces the number of components.

(3) The light source is formed by a side-view type LED 15, and the light guide 8 and circuit board 6 are arranged proximal to each other beside the LED 15. Thus, the LED 15 and the light guide 8 are arranged on the same plane. This prevents enlargement of the operation device 1 in the widthwise direction (vertical direction as viewed in FIG. 5).

(4) The recesses 16a are shaped, sized, and concentrated in an appropriate manner. This enables accurate adjustment of the amount of light reflected by the recesses 16a toward the illumination windows 5. Thus, differences in the brightness and color of the light illuminating the illumination windows 5 are suppressed.

It should be apparent to those skilled in the art that the present invention may be embodied in many other specific forms without departing from the spirit or scope of the invention. Particularly, it should be understood that the present invention may be embodied in the following forms.

Figure 7:
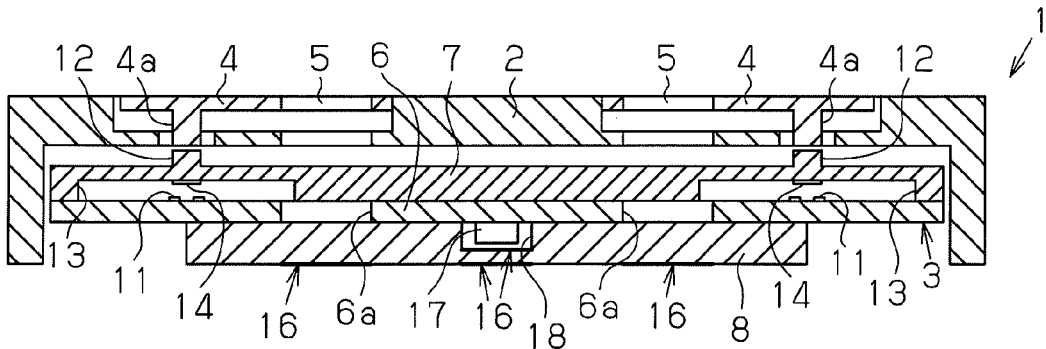
FIG. 7 is a cross-sectional view showing an operation device according to a further embodiment of the present invention.

The light source is not limited to the side-view type LED 15. For example, the light source may be a top-view LED that emits light in a direction perpendicular to the surface of the circuit board 6. More specifically, as shown in the example of FIG. 7, a top-view type LED 17 may be arranged at a position located at the middle of a line connecting the two openings 6a on the lower surface of the circuit board 6. In this case, the light guide 8 is arranged in close contact with the lower surface of the circuit board 6, which includes an LED compartment 18 for accommodation of the LED 17. As shown by the thick lines in FIG. 7, the reflectors 16 are arranged on the bottom surface of the LED compartment 18 and at locations corresponding to the LED 17 and the illumination windows 5 on the lower surface of the light guide 8. This structure enables the light guided into the light guide 8 from the LED 17 to be angles by a certain degree with respect to the planar direction of the light guide 8. Accordingly, light is reflected by the upper and lower surfaces of the light guide 8 and guided to locations corresponding to the openings 6a (i.e., the reflectors 16 located below the openings 6a). This reduces the amount of light emitted sideward out of the light guide 8. Thus, the amount of light reflected toward the illumination windows 5 is ensured.

The light source is not limited to the LEDs 15 and 17 and may be any light emitting body that emits light, such as an incandescent lamp bulb or an electroluminescence (EL) element.

The reflectors 16 do not have to be formed by a plurality of the recesses 16a and may be formed by, for example, a plurality of projections shaped similar to the recesses 16a.

The shape, size, and concentration of the recesses 16a forming the reflectors 16 are not limited. For example, the recesses 16a may be forming by, for example, sandblasting and texturing the light guide 8.

The housing 2 does not have to be box-shaped, and may be a plate that covers the switch assembly 3.

The illumination windows 5 may be arranged in the operation portions 4 or near the operation portions 4.

More than one light source 15 may be used. However, it is preferred that the quantity of the light sources 15 be less than the quantity of the illumination windows 5 and that at least one light source 15 be arranged on the circuit board 6.

The present examples and embodiments are to be considered as illustrative and not restrictive, and the invention is not to be limited to the details given herein, but may be modified within the scope and equivalence of the appended claims.

What is claimed is:

1. An operation device comprising:

an ornamental panel having a front side and a rear side, the ornamental panel including a plurality of operation portions arranged on the front side and a plurality of illumination portions respectively arranged in or near the plurality of the operation portions, wherein the illumination portions are light-transmissive;

a resiliently deformable member arranged at the rear side of the ornamental panel and resiliently deformed by force applied by the plurality of operation portions;

a plurality of contacts arranged on the resiliently deformable member;

a circuit board arranged adjacent to the resiliently deformable member and including a first surface facing toward the resiliently deformable member and a second surface located on the opposite side of the first surface;

a plurality of switches arranged on the first surface of the circuit board in correspondence with the plurality of contacts, wherein each of the plurality of switches is contactable with a corresponding one of the contacts when the resiliently deformable member is resiliently deformed;

at least one light source arranged on the second surface of the circuit board, wherein quantity of the at least one light source is less than quantity of the plurality of illumination portions; and a light guide, arranged on the second surface of the circuit board, for guiding light from the at least one light source to each of the plurality of illumination portions;

wherein the circuit board includes a plurality of openings extending through the circuit board at locations corresponding to the plurality of illumination portions, and the light guide includes a reflection structure for reflecting light from the at least one light source toward the plurality of openings.

2. The operation device according to claim 1, wherein:
the light guide includes a third surface facing toward the circuit board and a fourth surface located on the opposite side of the third surface; and
the reflection structure is formed by partially roughening at least one of the third surface and the fourth surface.

3. The operation device according to claim 1, wherein:
the at least one light source is configured by a side-view light source for emitting light in a direction parallel to the second surface of the circuit board; and
the light guide is arranged adjacent to the at least one light source on the second surface of the circuit board.

4. The operation device according to claim 1, wherein:
the at least one light source is configured by a top-view light source for emitting light in a direction perpendicular to the second surface of the circuit board;
the light guide includes a compartment for accommodating the at least one light source; and
the reflection structure includes a first reflector arranged in the compartment for diffusing and reflecting light in the light guide from the at least one light source, and a second reflector for reflecting the light diffused and reflected by the first reflector toward the openings.

5. The operation device according to claim 1, wherein the reflection structure includes a plurality of recesses, and the plurality of recesses are shaped, sized, and concentrated so as to suppress variations in the reflection of light.

6. The operation device according to claim 1, wherein the reflection structure includes a plurality of projections, and the plurality of projections are shaped, sized, and concentrated so as to suppress variations in the reflection of light.

* * * * *

UNITED STATES PATENT AND TRADEMARK OFFICE
CERTIFICATE OF CORRECTION

PATENT NO.         : 7,455,415 B2
APPLICATION NO. : 11/853888
DATED              : November 25, 2008
INVENTOR(S)        : Akihito Miyagawa and Kouichi Itoigawa It is certified that error appears in the above-identified patent and that said Letters Patent is hereby corrected as shown below:

On the Title Page, at item (12), Inventor name should be "Miyagawa et al."

On the Title Page, at item (75), First Inventor name should be "Akihito Miyagawa"

Signed and Sealed this

Tenth Day of February, 2009

JOHN DOLL
*Acting Director of the United States Patent and Trademark Office*